(12) United States Patent
Wang et al.

(10) Patent No.: US 9,013,496 B2
(45) Date of Patent: Apr. 21, 2015

(54) RENDERING GLOBAL LIGHT TRANSPORT IN REAL-TIME USING MACHINE LEARNING

(75) Inventors: Jiaping Wang, Beijing (CN); Peiran Ren, Beijing (CN); Minmin Gong, Beijing (CN); Xin Tong, Beijing (CN); Stephen S. Lin, Beijing (CN); Baining Guo, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 221 days.

(21) Appl. No.: 13/526,716

(22) Filed: Jun. 19, 2012

(65) Prior Publication Data

US 2013/0335434 A1 Dec. 19, 2013

(51) Int. Cl.
G09G 5/00 (2006.01)
G06N 99/00 (2010.01)
G06T 15/50 (2011.01)

(52) U.S. Cl.
CPC ............ G06N 99/005 (2013.01); G06T 15/506 (2013.01)

(58) Field of Classification Search
CPC .............................. G06T 15/506; G06T 15/80
USPC ...................... 706/12; 345/581, 426
See application file for complete search history.

(56) References Cited

U.S. PATENT DOCUMENTS

2004/0046768 A1* 3/2004 Nakajima ..................... 345/619
2006/0132486 A1 6/2006 Kim et al.
2008/0259081 A1 10/2008 Bunnell

OTHER PUBLICATIONS

Bleier et al., "Color Constancy and Non-Uniform Illumination: Can Existing Algorithms Work?" in the Proceedings of the 2011 IEEE International Conference on Computer Vision Workshops, p. 779.*
Cochran, et al., "Second-Order Illumination in Real-Time," ACM SE '07, Proceedings of the 45th Annual Southest Regional Confrerence, Mar. 23, 2007, 6 pages.
Dachsbacher, et al., "Splatting Indirect Illumination," I3D '06 Proceedings of the 2006 Symposium on Interactive 3D Graphics and Games, Mar. 2006, 8 pages.
Green, et al., "View-Dependent Precomputed Light Transport Using Nonlinear Gaussian Function Approximations," I3D '06 Proceedings of the 2006 Symposium in Interactive 3D Graphics and Games, Mar. 2006, pp. 1-8.
Ritschel, et al., "Interactive Global Illumination Based on Coherent Surface Shadow Maps," GI '08 Proceedings of Graphics Interface 2008, May 2008, 8 pages.

(Continued)

*Primary Examiner* — Maurice L McDowell, Jr.
(74) *Attorney, Agent, or Firm* — Dan Choi; Judy Yee; Micky Minhas

(57) ABSTRACT

Some implementations disclosed herein provide techniques and arrangements to render global light transport in real-time or near real-time. For example, in a pre-computation stage, a first computing device may render points of surfaces (e.g., using multiple light bounces and the like). Attributes for each of the points may be determined. A plurality of machine learning algorithms may be trained using particular attributes from the attributes. For example, a first machine learning algorithm may be trained using a first portion of the attributes and a second machine learning algorithm may be trained using a second portion of the attributes. The trained machine learning algorithms may be used by a second computing device to render components (e.g., diffuse and specular components) of indirect shading in real-time.

20 Claims, 8 Drawing Sheets

(56) References Cited

OTHER PUBLICATIONS

Sloan, et al., "Precomputed Radiance Transfer for Real-Time Rendering in Dynamic, Low-Frequency Lighting Enironments," SIGGRAPH '02 Proceedings of the 29th Annual Conference on Computer Graphics and Interactive Techniques, Jul. 2002, 10 pages.

Walter, et al., "Global Illumination Using Local Linear Density Estimation," Cornell Program of Computer Graphics, ACM Transactions on Graphics, vol. 16, No. 3, Jul. 1997, 44 pages.

* cited by examiner

RENDERING GLOBAL LIGHT TRANSPORT IN REAL-TIME USING MACHINE LEARNING

BACKGROUND

Global light transport describes the complex ways in which light interacts with objects, such as inter-reflections and scattering. In computer graphics, global light transport is used to provide scenes with visually rich shading effects for photo-realistic rendering of scenes. The shading detail from global light transport arises from light that reflects off surfaces in a scene. This reflected light, known as indirect illumination, may be computationally intensive to render because of the many light bounces that may be simulated as part of the scene. Thus, rendering of indirect illumination is difficult to achieve on most computing devices because of the large amounts of computing resources (e.g., cores/processors, storage memory, and the like) that are required to compute and/or store the indirect illumination.

There are several challenges to rendering indirect illumination. One challenge is handling dynamic scenes with local light sources. Traditional techniques may be impractical for handling dynamic scenes with local light sources because of the prohibitive costs of storing the pre-computed light transport (e.g., typically several hundred megabytes) for each scene configuration. Another challenge is dealing with the multiple bounces of interreflected light as it travels through the scene. Each additional bounce in each light path that is rendered adds to the computational requirements.

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

Some implementations disclosed herein provide techniques and arrangements to render global light transport in real-time or near real-time (e.g., any delay that occurs is imperceptible to human users). For example, in a pre-computation stage, a first computing device may render points of surfaces (e.g., using multiple light bounces and the like). A set of attributes for each of the points may be determined. A plurality of machine learning algorithms may be trained using particular attributes of the set of attributes. For example, a first machine learning algorithm may be trained using a first portion of attributes and a second machine learning algorithm may be trained using a second portion of attributes for each of the points. The trained machine learning algorithms may be used by a second computing device (e.g., a user device) to render components, such as diffuse and specular components, of indirect shading in real-time or near real-time.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

DETAILED DESCRIPTION

Global Light Transport

Figure 1:
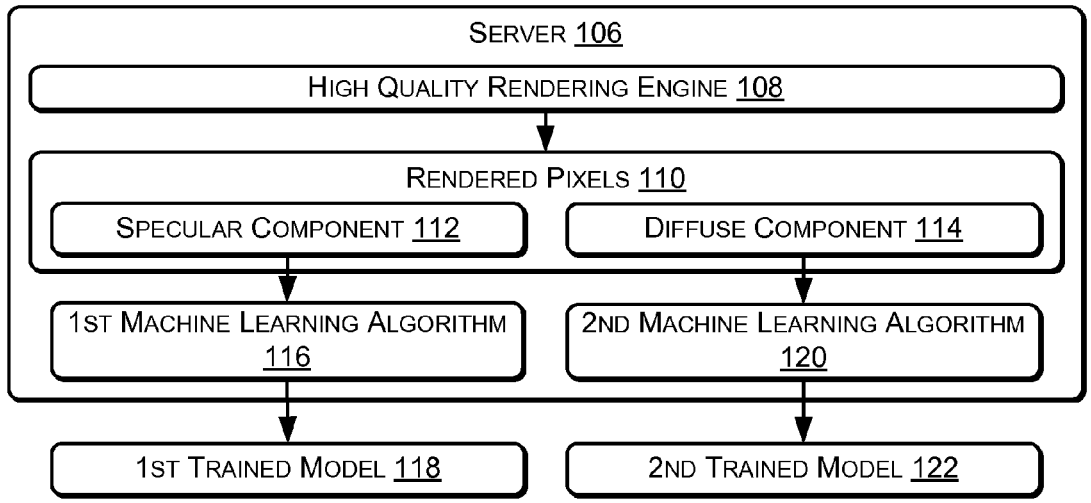
FIG. 1 illustrates an example framework that includes trained models to determine indirect shading values of points on a surface in real-time according to some implementations.
Figure 1:
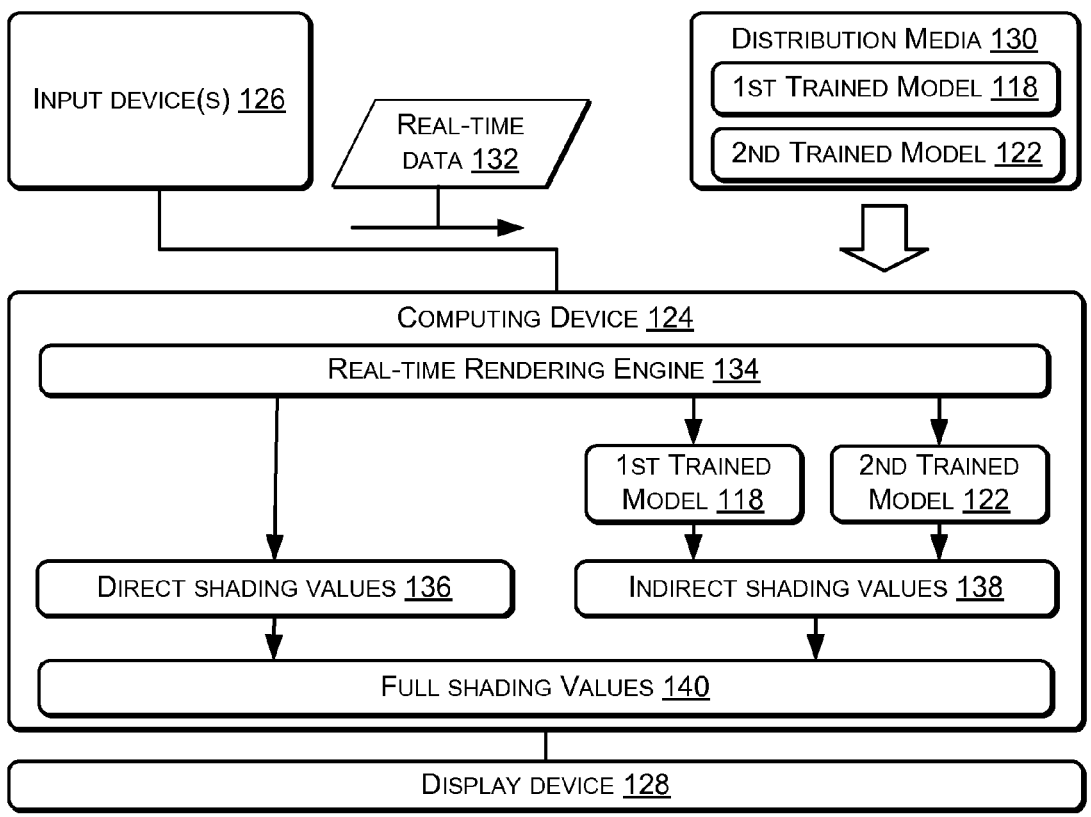

The technologies described herein generally relate to rendering photo-realistic global light transport in real-time. Light interacts with surfaces in complex ways, resulting in various phenomena, such as inter-reflections and scattering, that may be collectively referred to as global light transport. Simulating global light transport may be computationally intensive and may be possible only when a large amount of computational resources (e.g., processors, cores, memory, and/or storage) and/or time is available. For example, a computing device accessible to a user, such as a desktop computer, a laptop computer, a tablet computer, a handheld gaming console, or a smartphone may not have a sufficient amount of computational resources to calculate global light transport in real-time.

To render global light transport, including multi-bounce light paths and dynamic scenes with local light sources, machine learning techniques may be used to train models on various components of indirect light in scenes. The training may occur offline (e.g., not in real-time) in a pre-computing stage. For example, a game developer or application developer may perform the training. The trained models may be provided to users for use on computing devices to generate high quality (e.g., multi-bounce light paths) shading in real-time. The trained models may be (1) relatively small compared to the training set (e.g., kilobytes rather than megabytes) and (2) capable of quickly determining indirect light shading in real-time using the computing resources available on user-accessible computing devices (e.g., phone, tablet device, gaming console, and the like).

The indirect illumination of points may be determined under various viewing and scene conditions in the pre-computing stage (e.g., offline). The rendering may be relatively high quality (e.g., there may be no constraints on a number of light bounces that are calculated). Because the rendering is not constrained by real-time performance requirements in the pre-computing stage, the amount of time and/or computational resources (e.g., processors/cores, memory, time to compute, and the like) used to perform the rendering may be significantly higher than when real-time rendering is performed. To illustrate, an application developer or game developer may perform the offline rendering in the pre-computing stage. Machine learning, such as non-linear regression, may be used to learn point regression functions (PRFs) which represent a mapping from local and contextual properties of surface points to their indirect illumination values.

After the machine learning takes place, the PRFs may be provided to users. For example, users may download the PRFs via the Internet or load the PRFs from a distribution media (e.g., optical disc, flash memory drive, and the like). At run time, when the user is executing an application, such as a video game, the PRFs may be evaluated at visible points to predict their indirect illumination for viewing and scene conditions in the graphical output of the application. Thus, the PRFs may provide results comparable or equivalent to the fully computed inter-reflection effects in the training data, while providing a compact representation (e.g., kilobytes rather than the megabytes) for various scenes, including dynamic scenes with local light sources. The techniques described here may be used for complex dynamic scenes with both diffuse and glossy surfaces.

To render indirect illumination in real-time, there are two challenges: (1) handling dynamic scenes with local light sources and (2) dealing with the multiple bounces of inter-reflected light as the light travels through the scene. Some techniques (e.g., pre-computed radiance transfer) may be impractical for handling dynamic scenes with local light sources because of the prohibitive costs of storing the pre-computed light transport for a broad range of scene configurations. For multiple bounces of inter-reflected light, each additional bounce that is accounted for along light paths adds to the computations performed to simulate the inter-reflections in the scene. Typically, to address real-time rendering performance, only one or two inter-reflection bounces may be computed because of the computational burden to compute additional bounces.

To enable real-time rendering of indirect illumination, the PRFs may be designed as non-linear functions of surface point properties, such that the PRFs have a compact representation (e.g., a relatively small size) that is fast to evaluate (e.g., capable of evaluation in real-time with relatively modest computational resources). The PRFs may be learned for a given scene using non-linear regression on pre-computed training samples (e.g., during offline rendering). The training samples may include a subset of surface points rendered with random viewing and scene conditions. The indirect lighting effects of a surface point in a particular scene may be determined by various properties, such as the surface material, geometric properties (e.g. position and surface normal), relative positions of light sources and viewpoint, and the like. The properties of a point on a surface may be referred to herein as fragment attributes. The PRF may be trained using the fragment attributes of a set of points selected at random from various surfaces in a scene. For a dynamic scene, the fragment attributes may also include parameters for scene elements that are moving.

A trained PRF may include multiple light bounces and dynamic scenes with local light sources because the pre-computed samples used to train the PRF may include fully computed inter-reflection effects and multiple light bounces. In addition, non-linear regression models, such as PRFs, may provide a compact representation (that requires a relatively small amount of storage) even for dynamic scenes with local lighting. For example, the PRFs may have a size expressed in terms of kilobytes as compared to the megabytes of storage for rendering a scene with multiple light bounces and dynamic scenes with local light sources.

To provide modeling and processing efficiency, the indirect lighting values may be decomposed into a diffuse component and a specular component. The diffuse component of indirect lighting values may be used to train a first non-linear PRF while the specular component of indirect lighting values may be used to train a second non-linear PRF. The first PRF may be selected based on an ability of the first PRF to accurately model the diffuse component. The second PRF may be selected based on an ability of the second PRF to accurately model the specular component. For example, a multilayer perceptron neural network or similar algorithm may be used to model the diffuse component because the multilayer perceptron neural network provides a compact representation of low frequency functions. A random forests algorithm or a similar algorithm may be used to model the specular component because the greater flexibility of the random forests algorithm may be more suited to high frequency specular effects. The random forests algorithm is an ensemble classifier that includes many decision trees and outputs a class that is a mode of classes output by individual trees.

Thus, in an offline stage, a diffuse PRF and a specular PRF may be trained using indirect lighting of sampled surface points that are pre-computed under sampled viewpoints, lighting conditions and dynamic scene configurations. In some cases, the sampling of surface points may be random while in other cases the sampling may be designed to select the widest distribution of attributes. The diffuse PRF and the specular PRF may be smaller in size than the training data itself, enabling the diffuse PRF and the specular PRF to be distributed with an application, such as a game. In a real-time stage, while determining direct illumination associated with each visible surface point, the fragment attributes of each visible surface point may be determined. The indirect lighting of each pixel may be computed from each pixel's fragment attributes using the diffuse PRF and the specular PRF, and added to the direct lighting to generate global illumination. Because determining the indirect lighting using the diffuse PRF and the specular PRF may use a relatively modest amount of computing resources (e.g., processors, cores, memory, and the like), high quality lighting of scenes may be rendered on user devices, such as desktop computers, laptop computers, tablet computing devices, media players, or phones.

The point-based regression models may enable the PRFs to be efficiently evaluated in a screen space with a deferred shading pass that can be integrated into existing rendering pipelines. In contrast to computationally intensive techniques that simulate the reflections of global illumination in a scene, the computational resources used by the PRFs are completely independent of the number of light bounces. For example, the PRFs may render the full global illumination effects of a glossy scene at a resolution of 800×600 pixels in less than 10 milliseconds (ms). In addition, unlike traditional techniques (e.g., pre-computed radiance transfers) which may perform linear regression between incoming and outgoing radiance, the techniques described herein use non-linear regression to infer indirect lighting values with respect to fragment attributes defined at each surface point. By learning the non-linear coherence of indirect light transport for surface points with respect to their local properties and scene conditions, the PRFs can effectively model dynamic scenes and local light sources with modest pre-computation and storage costs. For example, the low-frequency diffuse inter-reflections and high-frequency glossy inter-reflections of a scene may be modeled with only 10 kilobytes (KB) and 40 megabytes (MB) of data, respectively. In contrast, pre-computed radiance field techniques used to render dynamic scenes with local lighting, may use approximately 0.1 frames per second (FPS) for a single glossy object and use 50 MB of data for a sparsely sampled radiance field. Larger scale scenes or scenes with high frequency lighting effects may use significantly higher computational resources and storage resources. The techniques described herein apply regression on fragment attributes of surface points (e.g., rather than on pixel values in images), as fragment attributes may have a closer physical relationship to the indirect lighting at the surface points. In addition, rather than partially computing the inter-reflection effects of dynamic scenes (i.e. a limited number of bounces or low frequency components of inter-reflection) due to computing resource constraints, the fragment regressors (e.g., the trained models) described herein model the full inter-reflection effects in dynamic scenes with both diffuse and glossy surfaces.

Thus, the techniques described herein may provide a compact and fast method of rendering multi-bounce indirect lighting effects of complex dynamic scenes illuminated by local light sources. The techniques described herein may be used for both diffuse and glossy scenes, with different viewpoints, lighting, materials, and dynamic scene configurations. Complex regression models and large pre-computed data sets may be used to provide high quality real-time global light transport on platforms with limited computing resources such as gaming consoles, phones, media players, tablet computing devices, and the like.

Framework to Render Global Light Transport

FIG. 1 illustrates an example framework 100 that includes trained models to determine indirect shading values of points on a surface in real-time according to some implementations. The framework 100 may be executed by a computing device or other particular machine specifically configured with processor-executable instructions, as discussed additionally below.

The framework 100 illustrates a pre-computation portion 102 and a real-time rendering portion 104. As discussed herein, the term "real-time" includes near real-time and substantially real-time, and therefore may include any delay that is not readily perceivable by a user. During the pre-computation portion 102, a computing device, such as a server 106, may be used to render pixels, such as rendered pixels 110. A relatively large amount of time and/or a relatively large amount of computational resources may be used to generate the rendered pixels 110. For example, a game developer may provide computational resources to generate a very high quality (e.g., multi-bounce light paths with no constraints as to the number of bounces) of the rendered pixels 110 over a period of time.

A high quality rendering engine 108 may randomly generate pixels in a scene in such a way that the rendered pixels 110 represent a sample of a wide variety of pixels displayed in the scene. Attributes of the rendered pixels 110, such as a specular component 112 and a diffuse component 114, may be identified. The specular component 112 may be used to train a first machine learning algorithm 116, resulting in a first trained model 118. The diffuse component 114 may be used to train a second machine learning algorithm 120, resulting in a second trained model 122.

The first machine learning algorithm 116 may be selected based on the type of content included in the specular component 112. The second machine learning algorithm 120 may be selected based on the type of content included in the diffuse component 114. Thus, in some cases, the first machine learning algorithm 116 may be different from the second machine learning algorithm 120. For example, the first machine learning algorithm 116 may be based on a multilayer perceptron neural network or similar algorithm while the second machine learning algorithm 120 may be based on a random forests or similar algorithm.

For ease of understanding, surfaces described herein are assumed to be opaque in nature, such that indirect shading may include the specular component 112 and the diffuse component 114. However, the techniques described herein may be extended to more complex surfaces, such as transparent and/or translucent surfaces by identifying additional components, such as a scattering component, a refraction component, and the like, in addition to the specular component 112 and the diffuse component 114. Thus, while two components, the specular component 112 and the diffuse component 114, of the rendered pixels 110 are illustrated in FIG. 1, other embodiments may include other additional components of the rendered pixels 110.

In the real-time rendering 104, a computing device 124 may be coupled to one or more input devices 126 and at least one display device 128. For example, the one or more input devices 126 may include one or more of a keyboard, a mouse, a joystick, a video game controller, another type of input device, or any combination thereof. The computing device 124 may be a desktop computing device, a laptop computing device, a tablet computing device, a hand-held computing device, a wireless phone device, a media playback device, a gaming console, another type of computing device, or any combination thereof.

The computing device 124 may receive the first trained model 118 and the second trained model 122 via distribution media 130 because of the relatively small size of the trained models 118 and 122 (e.g., on the order of kilobytes). For example, the trained models 118 and 122 may be received on a computer-readable storage media, such as an optical disk, or downloaded using a network.

The input devices 126 may generate real-time data 132. A real-time rendering engine 134 may use the real-time data 132 to generate pixels of a scene for display on the display device 128. The real-time rendering engine 134 may generate direct shading values 136. The real-time rendering engine 134 may provide data for evaluation to the first trained model 118 and the second trained model 122. The first trained model 118 and the second trained model 122 may evaluate the data to generate diffuse shading values and specular shading values, respectively, that may be combined to create the indirect shading values 138. The direct shading values 136 and the indirect shading values 138 may be combined to create full shading values 140 for display on the display device 128.

Because the trained models 118 and 122 were trained using the high-quality rendered pixels 110, the full shading values 140 may be of a very high quality. However, because the trained models 118 and 122 are merely evaluating inputs, the computations performed by the trained models 118 and 122 may be performed quickly (e.g., substantially in real-time) using relatively few computational resources. For example, the computational resources may be available in small, handheld, compact form-factor devices, such as portable gaming consoles, tablet computing devices, or wireless phone devices, in addition to other user accessible computing devices, such as laptops and personal computers.

Thus, offline pre-computation 102 may be used to generate the rendered pixels 110 and train the machine learning algorithms 116 and 120 to create the trained models 118 and 122. The trained models 118 and 122 may be relatively compact and relatively fast to evaluate, allowing for high quality rendering of global light transport in real-time.

Direct and Indirect Lighting

Figure 2:
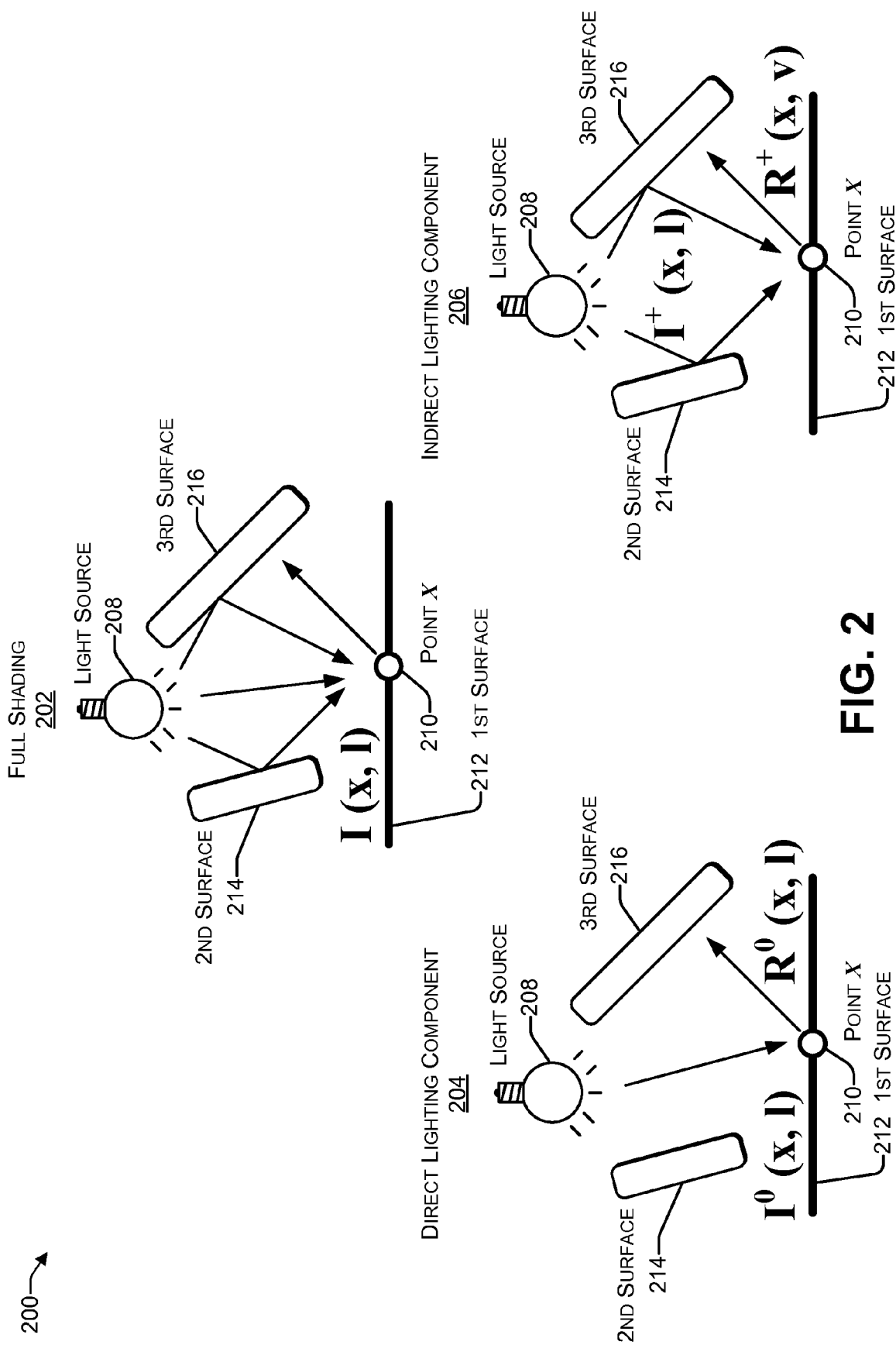
FIG. 2 is an architecture that includes separating shading into components, including a direct lighting component and an indirect lighting component according to some implementations.

FIG. 2 is an architecture 200 that includes separating shading into components, including a direct lighting component and an indirect lighting component according to some implementations. For example, the real-time rendering engine 134 of FIG. 1 may combine the direct shading values 136 and the indirect shading values 138 to create the full shading values 140.

In FIG. 2, full shading 202 may be comprised of a direct lighting component 204 and an indirect lighting component 206. When a light source 208 illuminates a point x 210 on a first surface 212, the direct lighting component 204 may include light rays that directly hit and reflect off of the point x 210. The indirect lighting component 206 may include light rays that hit and reflect off of at least one other surface, such as the second surface 214 or the third surface 216, before hitting the point x 210.

Mathematically speaking, the shading of an opaque surface point x as viewed from v may be described by the following rendering equation:

$$s = \int_{\Omega^+} \rho(x, v, l)(n \cdot l) I(x, l; L) dl \quad (1)$$

$$= R^0(x, v) + \int_{\Omega^+} \rho(x, v, l)(n \cdot l) I^+(x, l; L) dl$$

$$= R^0(x, v) + R^+(x, v)$$

where $\rho$ and $n$ denote the bidirectional reflectance distribution function (BRDF) and normal of the surface point x, and $I(x,l;L)$ represents the incoming radiance determined by the lighting condition L. As illustrated in FIG. 2, the full shading 202 can be separated into the direct lighting components 204 and the indirect lighting components 206 that correspond to direct lighting and indirect lighting, respectively. Because the direct component $R^0$ may be efficiently computed using conventional methods, the techniques described herein focus on efficiently computing the indirect component $R^+$ that results from indirect incoming radiance $I^+$, which may arise from one or more reflections of illumination from the light source 208. The indirect lighting components 206 may be further separated into additional components, such as a diffuse component and a specular component, $s_d^+$ and $s_s^+$, respectively, according to the last reflection event:

$$R^+(x, v) = \quad (2)$$

$$s_d^+ + s_s^+ = \int_{\Omega^+} r_d(n \cdot l) I^+(x, l; L) dl + \int_{\Omega^+} \rho_s(x, v, l)(n \cdot l) I^+(x, l; L) dl$$

Assuming a static scene and a parametric model of reflectance, the diffuse component of the shading $s_d^+$ value due to indirect lighting may depend on position x, normal n, diffuse reflectance coefficients $r_d$ and lighting condition L. Including illumination from local point sources, the lighting condition may be designated by the light source position p. Thus, a point regression function may be used to map scene factors to the diffuse component of the shading value using the following equation:

$$S_d: t_d \rightarrow s_d^+; t_d = (x, n, p; r_d) \quad (3)$$

The specular component may include a viewing direction v and a specular bidirectional reflectance distribution function (BRDF) $\rho_s$. The BRDF $\rho_s$ may include a specular coefficient $r_s$ and a glossiness parameter $\alpha$. The specular component of the shading value may be expressed by the following mapping equation:

$$S_s: t_s \rightarrow s_s^+; t_s = (x, n, p; r_d, r_s, \alpha; v) \quad (4)$$

Because different points in a scene may have different positions x, both mappings $S_d$ and $S_s$ may represent functions. Parameters associated with the functions $S_d$ and $S_s$ may be referred to as fragment attributes. The fragment attributes may be calculated locally at each fragment, and may be related to the indirect shading values as shown in equation (2). Although indirect shading values are related to fragment attributes, $S_d$ and $S_s$ may not be determined from fragment attributes without full scene information and offline rendering.

Offline Pre-Computation

Figure 3:
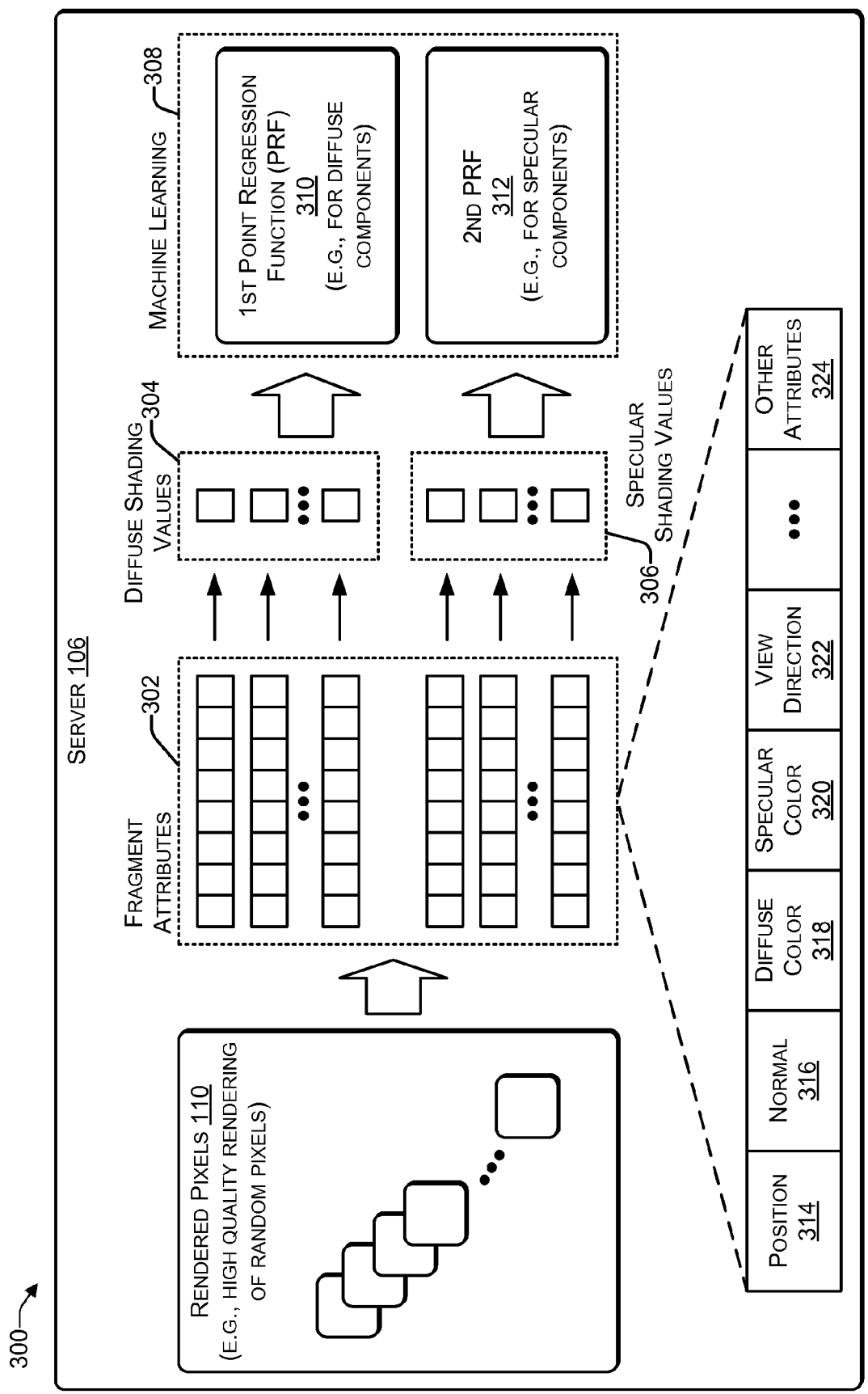
FIG. 3 illustrates an example architecture that includes at least two point regression functions according to some implementations.

FIG. 3 illustrates an example architecture 300 that includes at least two point regression functions according to some implementations. The architecture 300 illustrates the pre-computation 102 of FIG. 1.

The server 106 may execute the high quality rendering engine 108 to generate the rendered pixels 110. The rendered pixels 110 may include a set of points of surfaces in a scene. The set of points may be randomly selected or selected based on specific criteria. For example, the set of points may be selected to include a wide distribution of points on surfaces in a scene such that each point in the random set of points has at least one attribute that is different from the other points in the random set of points.

The rendered pixels 110 may be rendered using high quality rendering (e.g., including multiple light bounces or inter-reflections) because the offline rendering process may be unconstrained with real-time performance considerations. In addition, the pre-computation 102 may be performed by computational resources that are greater than the computational resources that are available during the real-time rendering 104.

The server 106 may identify fragment attributes 302 associated with each of the rendered pixels 110. Shading values, such as diffuse shading values 304 and specular shading values 306, may be extracted from the fragment attributes. The diffuse shading values 304 and the specular shading values 306 may be used as training data for machine learning 308. For example, a first point regression function (PRF) 310 may be trained using the diffuse shading values 304 to create the first trained model 118 of FIG. 1. A second PRF may be trained using the specular shading values 306 to create the second trained model 122. Each of the PRFs 310 and 312 may be selected based on the type of shading values used as the training data. For example, the first PRF 310 may be selected based on the ability to learn diffuse shading values and provide a compact representation that may be evaluated in real-time with relatively few computational resources (e.g., processors/cores, storage, memory, and the like). The second PRF 312 may be selected based on the ability to learn specular shading values and provide a compact representation that may be evaluated in real-time with relatively few computational resources.

While two shading values (e.g., the diffuse shading values 304 and the specular shading values 306) are illustrated in FIG. 3, in some implementations, additional shading values may be extracted. For example, when transparent or translucent objects are displayed in scenes, additional lighting components, such as a multiple surface scattering component, a refraction component, and the like may be extracted from the fragment attributes 302. The additional lighting components may be used to train additional PRFs to create additional trained models. For example, a third PRF may be trained using multiple surface scattering components of the fragment attributes 302. A fourth PRF may be trained using refraction components of the fragment attributes 302.

The fragment attributes may include various properties associated with each of the rendered pixels 110, such as a position 314 (e.g., a position of the associated pixel), a normal 316 (e.g., perpendicular to a surface), a diffuse color 318, a specular color 320, a view direction 322, other attributes 324, or any combination thereof. Of course, in some implementations, other properties may be included in addition to or instead of the attributes 314, 316, 318, 320, 322, or 324.

The PRFs 310 and 312 may be learned from a relatively small set of training data that is derived from the fragment attributes 302 and the corresponding indirect shading values for the rendered pixels 110 of randomly sampled scene points. The rendered pixels 110 may be pixels of fragments at random surface points that are rendered with random viewing directions and light positions using high quality rendering techniques (e.g., bidirectional path tracing). The fragment attributes 302 and the indirect shading values (e.g., the diffuse shading values 304 and the specular shading values 306) of each rendered pixel may be collected as sampled observations of functions $S_d$ (e.g., diffuse component) and $S_s$ (e.g., specular component). A portion (e.g., approximately half) of the sampled observations may be used for training the PRFs 310 and 312 while a remaining portion of the sampled observations may be used for evaluating an accuracy of the PRFs 310 and 312. The regression in the PRFs 310 and 312 may be achieved by minimizing the difference between the pre-computed indirect shading and the prediction from the fragment regressors φ using the following equations:

$$\arg\min_{\phi_{MLP}} \|\phi_{MLP}(t_d) - s_d^+\|^2, \quad (5)$$

$$\arg\min_{\phi_{RF}} \|\phi_{RF}(t_s) - s_s^+\|^2$$

For regression of the diffuse component $S_d$, the first PRF 310 may be based on a multilayer perceptron neural network (MLP) or similar algorithm that models functions in a parametric manner and that is suited to low frequency visual effects, such as diffuse reflections. An MLP or similar algorithm that is relatively small in size and fast to evaluate (e.g., to enable real-time evaluation) may be selected for the diffuse component $S_d$.

For the specular component $S_s$, the second PRF 312 may be based on a random forests or similar algorithm that takes a non-parametric approach to modeling functions because of the high frequency nature of specular reflections. Though slightly slower to evaluate and somewhat larger in size than an MLP, an algorithm such as random forests may provide greater modeling flexibility and may more easily adapt to complex data, such as specular reflections. $S_d$ and $S_s$ may be modeled on a per-object basis, with directional fragment attributes normalized to a unit vector and positional attributes scaled to a range of [−1,1].

Thus, in an offline stage, a random selection of pixels representing points on surfaces in a scene may be rendered. Fragment attributes of each rendered pixel may be identified. Various components of indirect shading, such as diffuse shading and specular shading, may be determined based on the fragment attributes. The various components of indirect shading may be used as training data for machine learning algorithms, such as PRFs. A specific machine learning algorithm may be selected for each component based on the properties of the components. For example, a first type of PRF may be selected to learn a first type of indirect shading component, a second type of PRF may be selected to learn a second type of indirect shading component, and so on, based on the number of components. The PRFs may be selected based on their ability to provide a relatively compact (e.g., small) representation to enable the trained models to be used on computing devices with a relatively small amount of storage and/or memory. The PRFs may be selected based on their ability to be quickly evaluated in real-time using relatively few computing resources, such as the computing resources available in a handheld gaming console, a wireless phone, a tablet computing device, a portable media playback device, and the like.

Real-Time Rendering

Figure 4:
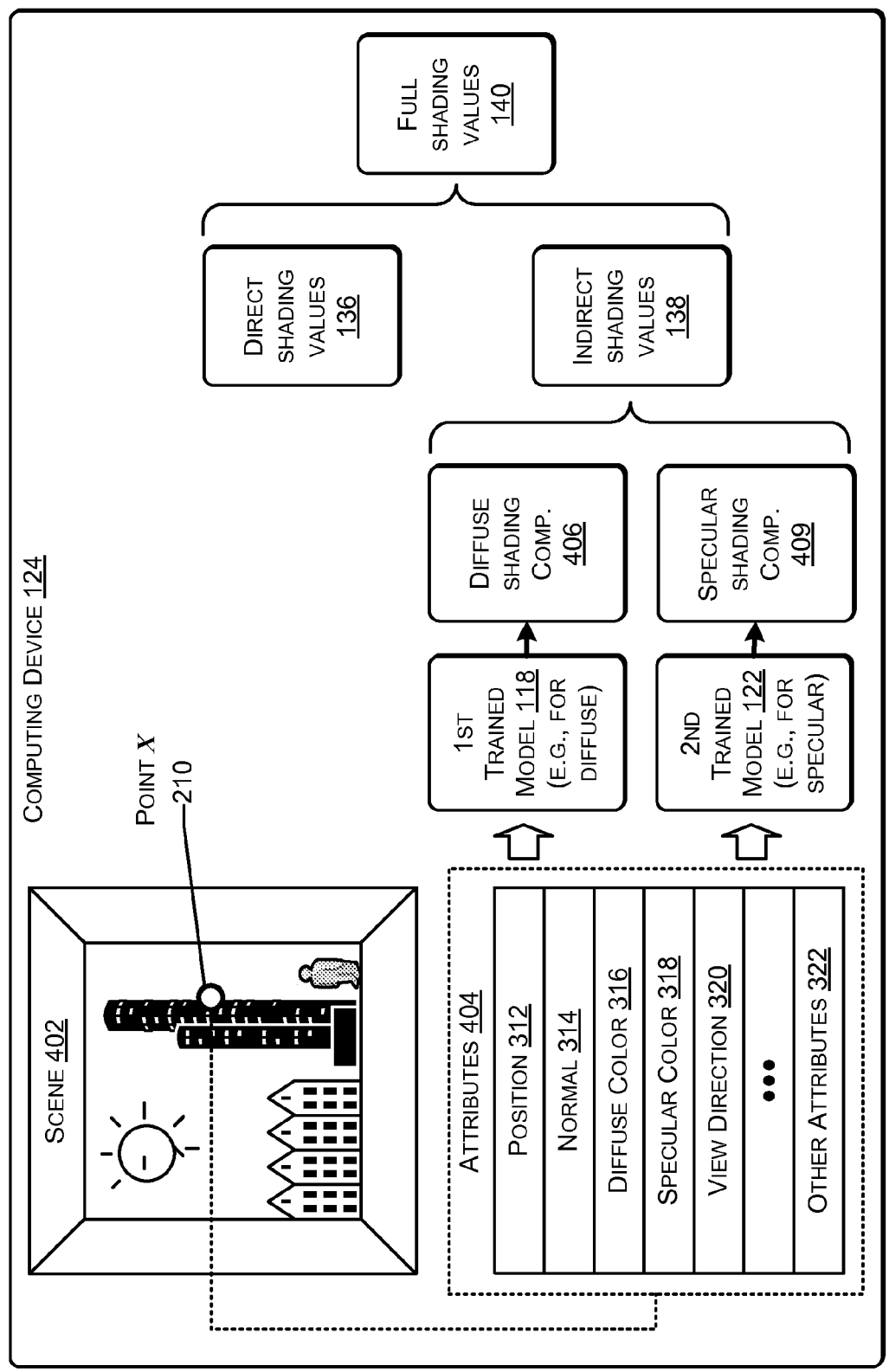
FIG. 4 illustrates an example architecture that includes using at least two trained models to determine indirect shading values according to some implementations.

FIG. 4 illustrates an example architecture 400 that includes using at least two trained models to determine indirect shading values according to some implementations. The architecture 400 illustrates the real-time rendering 104 of FIG. 1.

A user of the computing device 124 may instruct the computing device 124 to execute an application (e.g., a video game) that renders graphical scenes. For example, the computing device 124 may render the scene 402 that includes the point x 210. The computing device 124 may determine attributes 404 associated with multiple points (e.g., such as the point x 210) on one or more surfaces in the scene 402. For example, the computing device 124 may determine the attributes 404 when determining the direct shading values 136 of surfaces in the scene 402. The attributes 404 may include fragment attributes, such as the position 312 associated with each point, the normal 314 associated with each point, the diffuse color 316 associated with each point, the specular color 318 associated with each point, a view direction 320 associated with each point, other attributes 322, or any combination thereof.

The first trained model 118 may be created in the pre-computing stage by training the first PRF 310 of FIG. 3 with the diffuse shading values 304. The second trained model 122 may be created by training the second PRF 312 with the specular shading values 306.

During run-time, the computing device 124 may use the trained models 118 and 122 to determine diffuse shading components 406 and specular shading components 408, respectively, based on the attributes 404 of points in the scene 402. The diffuse shading components 406 and the specular shading components 408 may be combined to generate the indirect shading values 138 associated with points in the scene 402. The computing device 124 may compute the direct shading values 136 associated with points in the scene 402. The computing device may combine the direct shading values 136 with the indirect shading values 138 to create the full shading values 140. In some implementations, the direct shading values 136 and the indirect shading values 138 may be determined substantially contemporaneously (e.g., substantially in parallel).

Thus, in a real-time stage, a user may instruct a computing device to execute an application that outputs graphics, such as a video game. When executing the application, the computing device may determine attributes 404 of each fragment (e.g., points of surfaces, such as the point x 210) when determining the direct shading values 136. The fragment attributes 404 may be provided as input to the trained models 118 and 122 (e.g., trained fragment regressors of a given object) to predict the diffuse shading components 406 and the specular shading components 408 of the indirect shading values 138. The indirect shading values 138 may be combined with direct lighting (e.g., the direct shading values 136) to create a final rendering result (e.g., the full shading values 140).

To handle scenes with dynamic elements, the PRFs in equations (3) and (4) may be extended by incorporating fragment attributes that describe the state of each dynamic element. In some implementations, translations of a rigid object described with respect to object centroid b may be taken into account, resulting in the following extended mapping functions for dynamic scenes:

$$S_d:(x,n,p;r_d;b) \to s_d^+ \quad (6)$$

$$S_s:(x,n,p;r_d,r_s,\alpha;v;b) \to s_s^+ \quad (7)$$

Similar to the regression for static scenes, fragments may be sampled at random positions, viewing directions and light positions, while also setting the dynamic element at random positions in the pre-computation step. Point regression functions for diffuse and specular components may be trained with the resulting data. In the rendering step, fragment attributes may be calculated similar to the calculations for static scenes but with the addition of the dynamic object position b. The indirect shading value may be predicted by the point regression functions with the fragment attributes as input.

Fragment attributes for a dynamic object may be expressed in different ways, based on how the object is animated. Fewer attributes may result in lower computational costs while more attributes may result in greater computational costs. For example, for a sphere that is swinging motion, a swing angle associated with the swinging motion may be sufficient to describe the dynamics of the sphere.

Thus, by formulating indirect shading as a function of fragment attributes, non-linear regression may be used to efficiently model the non-linear variations in indirect shading. Point regression functions (e.g., the PRFs 310 and 312) may account for multiple factors that contribute to shading (e.g., surface point location, surface normal, and the like) in a unified manner, and exploit non-linear coherence to relate the fragment attributes 404 to the indirect shading values 138. Even when a training set includes a relatively small number of shading samples, the point regression functions may produce visually convincing results. Increasing the number of training samples may lead to higher accuracy, with rendering results that converge towards the ground truth. For example, a set of one thousand training samples may generate a rendering result that closely approximates the ground truth, while increasing the number of training samples reduce errors. Thus, point regression functions may be effective representations of indirect illumination.

Thus, PRFs may be trained with data computed with an unlimited (e.g., unconstrained) number of inter-reflection bounces. Because rendering up to three bounces of inter-reflection can result in significant deviations from the ground truth, the techniques described herein preserve the effects of multi-bounce light paths to enable generating photo-realistic computer-rendered images.

By formulating real-time rendering of indirect illumination (e.g., the indirect shading values 138) as a non-linear regression of multi-dimensional functions, point regression functions may be used to describe indirect illumination as a unified function of surface point properties in addition to view direction, lighting condition, and dynamic scene configuration. Detailed looking renderings may be achieved with a relatively small amount of training data, indicating significant non-linear coherence in the training data that can be modeled using a compact representation.

The techniques described herein may be further extended and enhanced. For example, instead of creating training sets based on randomly sampled points and scene conditions, training sets may be selected based on specific criteria, thereby accounting for scene geometry and data distributions, and reducing the risk of missing visual features. For example, when training multilayer perceptrons (MLPs), instead of manually segmenting a scene into objects and assigning each object an MLP that is independently trained, automatic scene segmentation and fusion of shading predictions from neighboring MLPs may increase an efficiency of MLP-based learning and processing. Construction of random forests may be improved by incorporating knowledge about the underlying light transport mechanisms in determining decision planes for branch creation. In addition, processing of dynamics scenes may be streamlined by adapting the set of fragment attributes for a scene object/region to account for animated objects that may have a discernible effect on shading.

Multilayer Perceptron

A multilayer perceptron (MLP) may be defined as a feed-forward artificial neural network that maps inputs to outputs using layered nodes (neurons) connected in a weighted directed graph. Each node of the neural network may be fully connected with a preceding layer. An output $S_j$ may be calculated based on the outputs of all the nodes $S_i$ in a preceding layer as follows:

$$s_j = \psi(b_j + \Sigma w_{ij} s_i) \quad (11)$$

where $w_{ij}$ is the connection weight from node i to node j, and $b_j$ is the bias weight of node j. All nodes of the neural network may have a non-linear activation function $\psi$ to simulate the state of biological neurons, either activated (e.g., "1") or not (e.g., "0"). The sigmoid function may be used as an activation function, to yield a smooth transition between the two states:

$$\psi(x) = (1 + e^{-x})^{-1} \quad (12)$$

A multilayer perceptron may capture the non-linear relationship of input data to output data using activation functions in each layer and compositions of the layers. Given a layout of the network (e.g. a number of layers of the network, a number of nodes in each layer, and the like), the network may be described by the connection weights $w_{ij}$ between each layers and bias weight $b_j$ of each node. For example, two hidden layers may be used with tens of nodes in each layer, resulting in an extremely compact (e.g., less than one kilobyte) representation that may be quickly evaluated at run time.

Random Forests Algorithm

A random forest (RF) algorithm may be defined as a collection of decision trees whose estimates are averaged to obtain a predicted output. A decision tree in an RF algorithm may be a binary tree in which each node splits the sampled data into two parts according to a threshold on the value at a d-th dimension of an input vector. The splitting may stop when the number of samples at a node falls below a threshold (e.g. 6 samples). The node may become a leaf node and the average of the associated samples may be assigned as output. Each tree may be built from a randomly sub-sampled training set, referred to as bootstrap samples.

An RF algorithm may scale to the sample data such that prediction error may decrease as more sample data is provided for training. Complex non-linearity and discontinuity may be modeled by decision trees with sufficient training data, which allows handling complex lighting effects caused by specular reflections. Given a fragment attribute, a predicted indirect shading value may be made after traversing all the decision trees.

Example Processes

Figure 5:
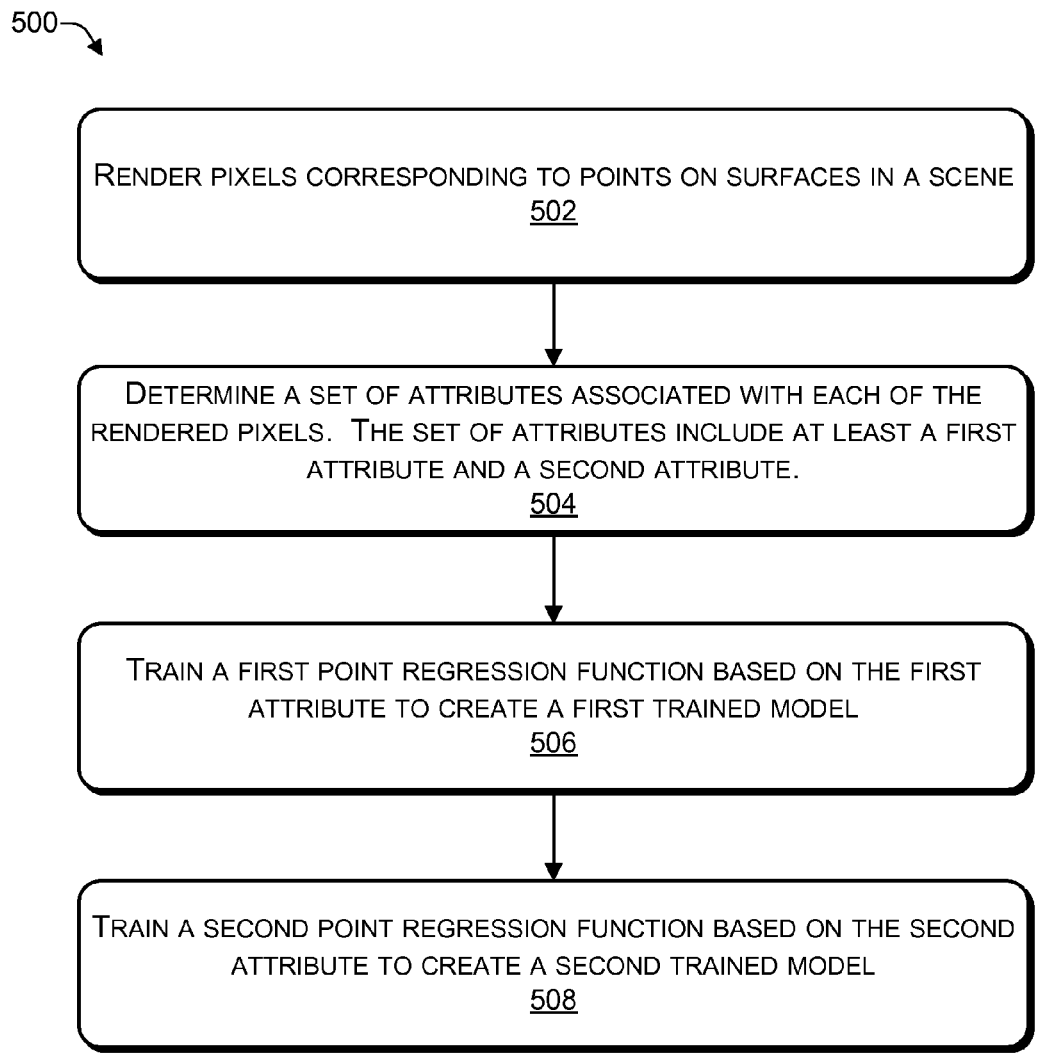
FIG. 5 is a flow diagram of an example process that includes training a first point regression function based on a first portion of attributes to create a first trained model according to some implementations.
Figure 6:
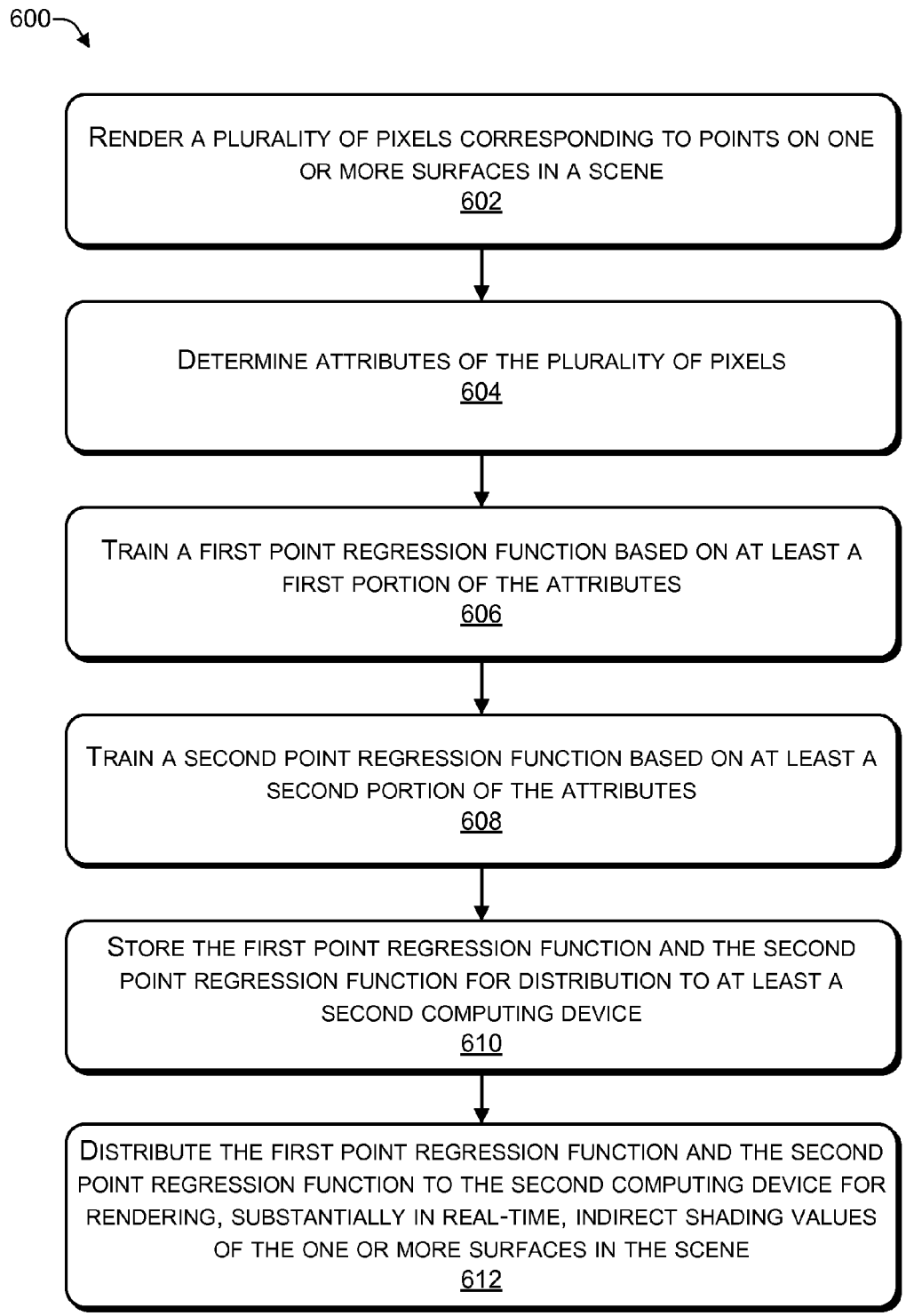
FIG. 6 is a flow diagram of an example process that includes training a second point regression function based on at least a second portion of attributes according to some implementations.
Figure 7:
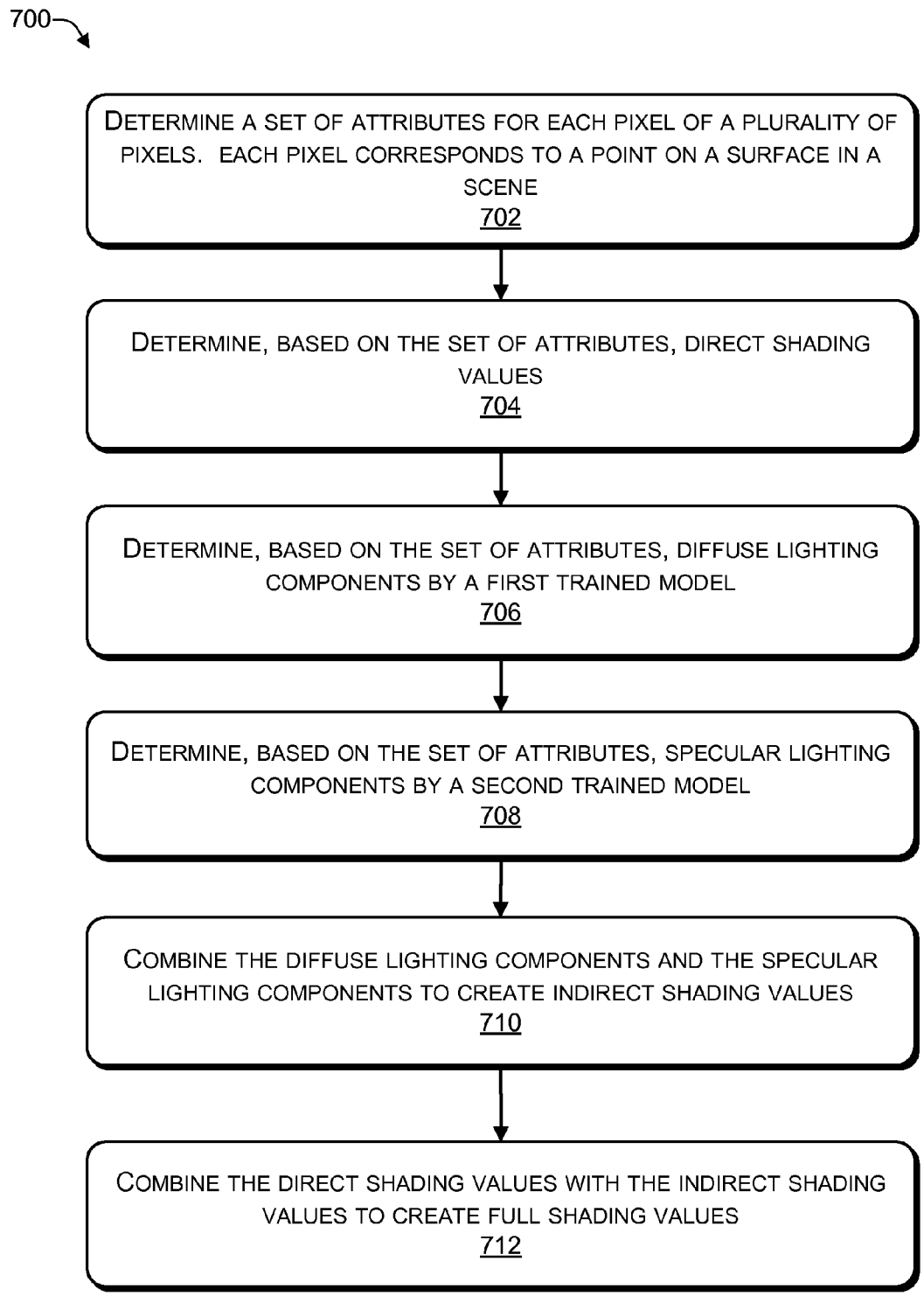
FIG. 7 is a flow diagram of an example process that includes combining diffuse lighting components and specular lighting components to create indirect shading values according to some implementations.

FIGS. 5, 6, and 7 show various processes to implement a blocking scheme. In the processes, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes may described with reference to the frameworks and/or architectures 100, 200, 300, or 400 described above, although other models, frameworks, systems and environments may implement these processes.

FIG. 5 is a flow diagram of an example process 500 that includes training a first point regression function based on a first portion of attributes to create a first trained model according to some implementations. For example, the process 500 may be performed in a pre-computation stage by a computing device, such as the server 106 of FIG. 1.

At 502, pixels corresponding to points on surfaces of a scene may be rendered. For example, in FIG. 1, the high quality rendering engine 108 may generate the rendered pixels 110. The rendered pixels 110 may correspond to random points on surfaces in a scene displayed by a software application, such as a video game.

At 504, a set of attributes associated with each of the rendered pixels may be determined. Each set of attributes may include at least a first portion of attributes and a second portion of attributes. For example, in FIG. 3, the fragment attributes 302 associated with each of the rendered pixels 110 may be determined.

At 506, a first PRF may be trained based on a first portion of attributes to create a first trained model. For example, in FIG. 3, the first PRF 310 may be trained on diffuse shading values derived from the fragment attributes 302 to create the first trained model 118.

At 508, a second PRF may be trained based on a second portion of attributes to create a second trained model. For example, in FIG. 3, the second PRF 312 may be trained on specular shading values derived from the fragment attributes 302 to create the second trained model 122.

Thus, during a pre-computation stage, high quality pixels corresponding to points on surfaces in a scene may be rendered. Attributes associated with each of the pixels may be determined and portions of the attributes may be used to train two or more PRFs on different components of indirect shading. The trained PRFs (e.g., the trained models) may be relatively compact and capable of computing shading values of surfaces in a scene substantially in real-time.

FIG. 6 is a flow diagram of an example process that includes training a second point regression function based on at least a second portion of attributes according to some implementations. For example, the process 600 may be performed in a pre-computation stage by a computing device, such as the server 106 of FIG. 1.

At 602, a plurality of pixels corresponding to points on one or more surfaces in a scene may be rendered. For example, in FIG. 1, the high quality rendering engine 108 may generate the rendered pixels 110. The rendered pixels 110 may correspond to random points on surfaces in a scene displayed by a software application, such as a video game.

At 604, attributes of the plurality of pixels may be determined. For example, in FIG. 3, the fragment attributes 302 associated with each of the rendered pixels 110 may be determined.

At 606, a first PRF may be trained based on at least a first portion of the attributes. For example, in FIG. 3, the first PRF 310 may be trained on diffuse shading values derived from the fragment attributes 302 to create the first trained model 118.

At 608, a second PRF may be trained based on at least a second portion of the attributes. For example, in FIG. 3, the second PRF 312 may be trained on specular shading values derived from the fragment attributes 302 to create the second trained model 122.

At 610, the first PRF and the second PRF may be stored for distribution to at least a second computing device. For example, in FIG. 1, the trained models 118 and 122 may be stored on the distribution media 130 for distribution to other computing devices, such as the computing device 124.

At 612, the first PRF and the second PRF may be distributed to the second computing device for rendering, substantially in real-time, indirect shading values of the one or more surfaces in the scene. For example, in FIG. 4, the attributes 404 of points in the scene 402, such as the point x 210, may be provided as input to the trained models 118 and 122 to generate the indirect shading values 138 in real-time.

Thus, PRFs trained using attributes of points of surfaces in high quality renderings may be used to render indirect shading values in real-time. The trained PRFs (e.g., the trained models 118 and 122) may be relatively compact and may be distributed via a network download or stored on a distribution media, such as optical disk. The trained PRFs may be able to determine components of indirect shading, such as diffuse shading values and specular shading values, in real-time with relatively few computing resources, such as the computing resources available in a handheld computing device, such as a phone, tablet, or portable gaming console.

FIG. 7 is a flow diagram of an example process that includes combining diffuse lighting components and specular lighting components to create indirect shading values according to some implementations. For example, the process 700 may be performed in real-time by a computing device, such as the computing device 124 of FIG. 1.

At 702, a set of attributes for each pixel of a plurality of pixels is determined. Each pixel may correspond to a point on a surface in a scene. For example, when rendering the scene 402, the set of attributes 404 associated with points (e.g., the point 210) on surfaces in the scene 402 may be determined. The set of attributes 404 may be determined when the computing device 124 is determining the direct shading values 136.

At 704, direct shading values may be determined based on the set of attributes. For example, in FIG. 4, the computing device 124 may determine the direct shading values 136.

At 706, diffuse lighting components may be determined by a first trained model based on the set of attributes. For example, in FIG. 4, the computing device 124 may use the first trained model 118 to determine the diffuse shading components 404 associated with the point x 210 based on one or more of the attributes 404.

At 708, specular lighting components may be determined by a second trained model based on the set of attributes. For example, in FIG. 4, the computing device 124 may use the second trained model 118 to determine the specular shading components 406 associated with the point x 210 based on one or more of the attributes 404.

At 710, the diffuse lighting components and the specular lighting components may be combined to create indirect shading values. For example, in FIG. 4, the computing device 124 may combine the diffuse shading components 404 and the specular shading components 406 to create the indirect shading values 138.

At 712, the direct shading values may be combined with the indirect shading values to create full shading values. For example, in FIG. 4, the computing device 124 may combine the direct shading values 136 with the indirect shading values 138 to create the full shading values 140.

Thus, trained models, such as the trained models 118 and 122, may be used to determine various (e.g., diffuse and specular) components of indirect shading in real-time. The various components may be combined to create indirect shading values for points of surfaces. The trained models may be relatively small in size (e.g., kilobytes rather than megabytes) and may be capable of producing high quality (e.g., unlimited number of bounces) indirect shading values with computational resources available in computing devices, such as a wireless phone, a media playback device, a handheld gaming console, a tablet computing device, and the like.

Example Computing Device and Environment

Figure 8:
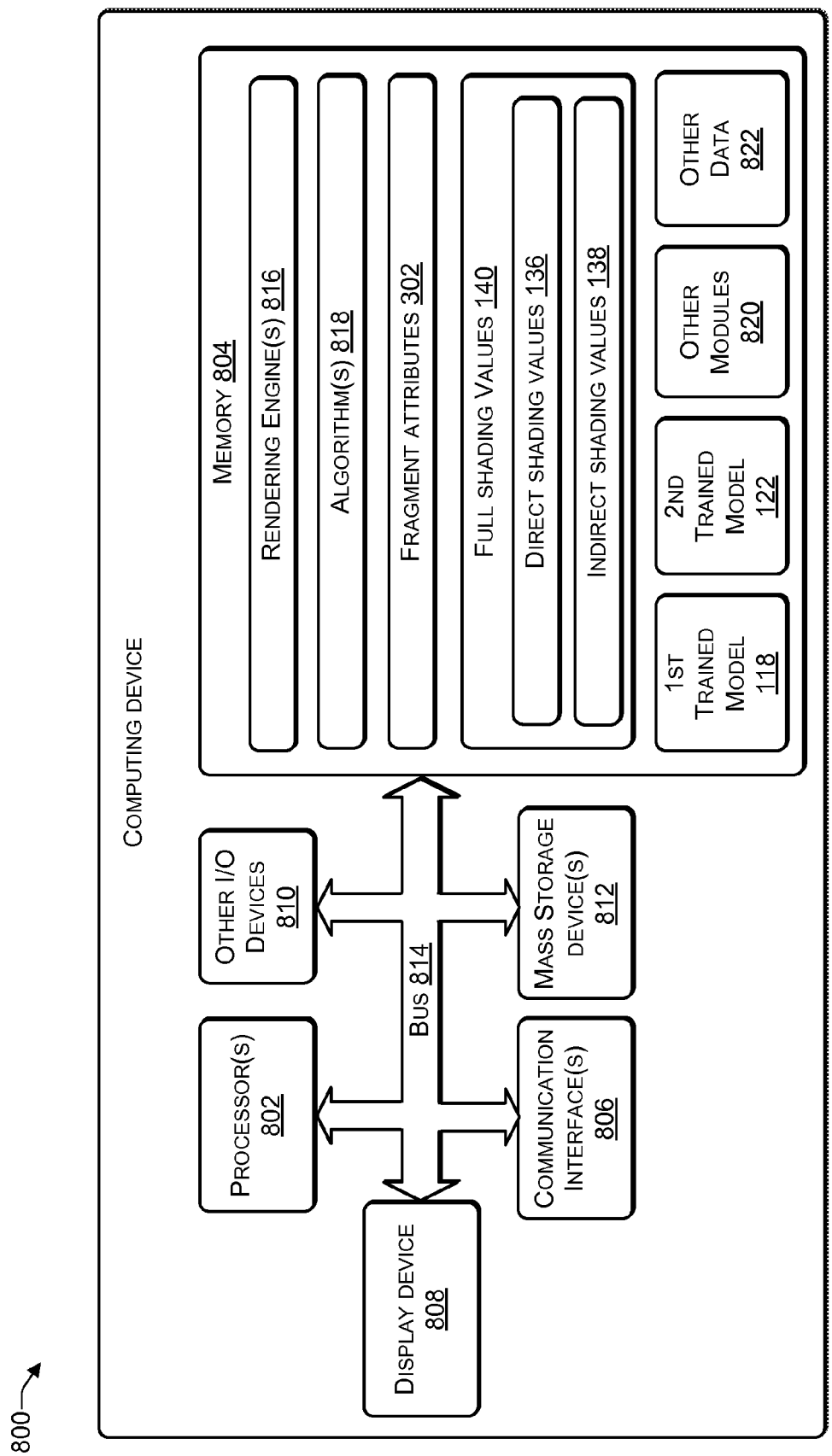
FIG. 8 is a block diagram of an example computing device and environment according to some implementations.

FIG. 8 illustrates an example configuration of a computing device 800 and environment that can be used to implement the modules and functions described herein. For example, the server 106 or the computing device 124 may include an architecture that is similar to the computing device 800.

The computing device 800 may include at least one processor 802, a memory 804, communication interfaces 806, a display device 808, other input/output (I/O) devices 810, and one or more mass storage devices 812, able to communicate with each other, such as via a system bus 814 or other suitable connection.

The processor 802 may be a single processing unit or a number of processing units, all of which may include single or multiple computing units or multiple cores. The processor 802 can be implemented as one or more microprocessors, microcomputers, microcontrollers, digital signal processors, central processing units, state machines, logic circuitries, and/or any devices that manipulate signals based on operational instructions. Among other capabilities, the processor 802 can be configured to fetch and execute computer-readable instructions stored in the memory 804, mass storage devices 812, or other computer-readable media.

Memory 804 and mass storage devices 812 are examples of computer storage media for storing instructions which are executed by the processor 802 to perform the various functions described above. For example, memory 804 may generally include both volatile memory and non-volatile memory (e.g., RAM, ROM, or the like). Further, mass storage devices 812 may generally include hard disk drives, solid-state drives, removable media, including external and removable drives, memory cards, flash memory, floppy disks, optical disks (e.g., CD, DVD), a storage array, a network attached storage, a storage area network, or the like. Both memory 804 and mass storage devices 812 may be collectively referred to as memory or computer storage media herein, and may be a non-transitory media capable of storing computer-readable, processor-executable program instructions as computer program code that can be executed by the processor 802 as a particular machine configured for carrying out the operations and functions described in the implementations herein.

Although illustrated in FIG. 8 as being stored in memory 804 of computing device 800, the rendering engines 816, the algorithms 818, the trained models 118 and 122, or portions thereof, may be implemented using any form of computer-readable media that is accessible by the computing device 800. As used herein, "computer-readable media" includes computer storage media.

Computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

The computing device 800 may also include one or more communication interfaces 806 for exchanging data with other devices, such as via a network, direct connection, or the like, as discussed above. The communication interfaces 806 can facilitate communications within a wide variety of networks and protocol types, including wired networks (e.g., LAN, cable, etc.) and wireless networks (e.g., WLAN, cellular, satellite, etc.), the Internet and the like. Communication interfaces 806 can also provide communication with external storage (not shown), such as in a storage array, network attached storage, storage area network, or the like.

A display device 808, such as a monitor may be included in some implementations for displaying information and images to users. Other I/O devices 810 may be devices that receive various inputs from a user and provide various outputs to the user, and may include a keyboard, a remote controller, a mouse, a printer, audio input/output devices, and so forth.

Memory 804 may include modules and components for training machine learning algorithms (e.g., PRFs) or for using trained machine learning algorithms according to the implementations described herein. The memory 804 may include multiple modules to perform various functions, such as one or more rendering engine(s) 816 and one or more modules implementing various algorithm(s) 818. The rendering engine(s) 816 may include one or more of the high quality rendering engine 108 or the real-time rendering engine 134 of FIG. 1. The algorithms 818 may include software modules that implement various algorithms, such as machine learning algorithms, including training, verifying, and evaluating an accuracy of machine learning algorithms such as point regression functions. The memory 804 may also include other modules 820 that implement other features and other data 822 that includes intermediate calculations and the like. The other modules 820, such as an operating system, drivers, communication software, or the like.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

What is claimed is:

1. A method under control of one or more processors configured with a computer-readable memory device storing executable instructions, the method comprising:
    rendering points on surfaces in a scene that includes global light transport;
    determining attributes associated with each of the points, the attributes including at least a first portion of the attributes and a second portion of the attributes;
    training a first point regression function based on the first portion of the attributes to create a first trained model, the first point regression function mapping the first portion of the attributes to at least a first component of indirect light; and
    training a second point regression function based on the second portion of the attributes to create a second trained model, the second point regression function mapping the second portion of the attributes to at least a second component of indirect light.

2. The method of claim 1, wherein the points on the surfaces in the scene are randomly selected.

3. The method of claim 1, wherein:
    the first portion of the attributes is associated with a specular component of the indirect light; and
    the second portion of the attributes is associated with a diffuse component of the indirect light.

4. The method of claim 1, wherein the first point regression function is based on a multiperceptron neural network algorithm.

5. The method of claim 1, wherein the second point regression function is based on a random forests algorithm.

6. The method of claim 1, wherein:
    the first trained model is executable to determine diffuse shading values based on attributes of points on a surface; and
    the second trained model is executable to render specular shading values based on the attributes of the points on the surface.

7. The method of claim 6, wherein the diffuse shading values and the specular shading values are combined to create indirect shading values.

8. A computing device comprising:
    one or more processors;
    computer-readable memory device including instructions executable by the one or more processors to perform acts comprising:
        rendering a plurality of points on one or more surfaces in a scene, the scene including light inter-reflections and light scattering;
        determining attributes of the plurality of points;
        training a first point regression function based on at least a first portion of the attributes;
        training a second point regression function based on at least a second portion of the attributes; and
        storing the first point regression function and the second point regression function for distribution to at least a second computing device.

9. The computing device of claim 8, wherein training the first point regression function comprises training the first point regression function using a training set that includes diffuse shading components of the attributes.

10. The computing device of claim 8, wherein training the second point regression function comprises training the second point regression function using a training set that includes specular shading components of the attributes.

11. The computing device of claim 8, wherein the first point regression function is based on a multiperceptron neural network algorithm.

12. The computing device of claim 8, wherein the second point regression function is based on a random forests algorithm.

13. The computing device of claim 8, further comprising distributing the first point regression function and the second point regression function to the second computing device for rendering, substantially in real-time, indirect shading values of surfaces in the scene.

14. Computer-readable memory device including instructions executable by one or more processors to perform operations comprising:
    determining a set of attributes for each of a plurality of points on one or more surfaces in a scene, the scene including illumination provided by global light transport, the global light transport including inter-reflections and scattering;
    determining, based on the set of attributes, direct shading values;
    determining, based on the set of attributes, diffuse lighting components by a first trained model comprising a first point regression function that maps the set of attributes to the diffuse lighting components;
    determining, based on the set of attributes, specular lighting components by a second trained model comprising a second point regression function that maps the set of attributes to the specular lighting components;
    combining the diffuse lighting components and the specular lighting components to create indirect shading values; and combining the indirect shading values with the direct shading values to create full shading values for output to a display device.

15. The computer-readable memory device of claim 14, wherein:
   the first trained model comprises a first machine learning algorithm trained using a first set of training data; and
   the second trained model comprises a second machine learning algorithm trained using a second set of training data.

16. The computer-readable memory device of claim 15, wherein:
   the first machine learning algorithm comprises a multiperceptron neural network algorithm; and
   the first set of training data comprises a first portion of the set of attributes associated with a set of pre-computed pixels.

17. The computer-readable memory device of claim 16, wherein:
   the second machine learning algorithm comprises a random forests algorithm; and
   the second set of training data comprises a second portion of the set of attributes associated with the set of pre-computed pixels.

18. The computer-readable memory device of claim 17, wherein:
   the first portion of the set of attributes comprises the diffuse lighting components; and
   the second portion of the set of attributes comprises the specular lighting components.

19. The computer-readable memory device of claim 14, wherein the set of attributes includes one or more of a position of a particular pixel, a normal associated with the particular pixel, a diffuse color associated with the particular pixel, a specular color associated with the particular pixel, or a view direction associated with the particular pixel.

20. The computer-readable memory device of claim 14, wherein the diffuse lighting components and the specular lighting components are rendered substantially in real-time.

* * * * *